United States Patent
Kilinc et al.

(10) Patent No.: US 10,567,135 B2
(45) Date of Patent: Feb. 18, 2020

(54) NETWORK NODE AND METHOD IN A WIRELESS COMMUNICATIONS NETWORK

(71) Applicant: Telefonaktiebolaget LM Ericsson (publ), Stockholm (SE)

(72) Inventors: Caner Kilinc, Luleå (SE); Yufei Blankenship, Kildeer, IL (US); Zhan Zhang, Beijing (CN); Zhenhua Zou, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 76 days.

(21) Appl. No.: 15/753,616

(22) PCT Filed: Jan. 26, 2018

(86) PCT No.: PCT/SE2018/050061
§ 371 (c)(1),
(2) Date: Feb. 20, 2018

(87) PCT Pub. No.: WO2018/174768
PCT Pub. Date: Sep. 27, 2018

(65) Prior Publication Data
US 2019/0260546 A1    Aug. 22, 2019

(30) Foreign Application Priority Data

Mar. 21, 2017   (WO) ............... PCT/CN2017/077499

(51) Int. Cl.
*H04L 5/00*      (2006.01)
*H04W 72/04*   (2009.01)

(52) U.S. Cl.
CPC ......... *H04L 5/0053* (2013.01); *H04W 72/048* (2013.01); *H04W 72/0446* (2013.01)

(58) Field of Classification Search
CPC ................... H04L 5/0053; H04W 72/0446
See application file for complete search history.

(56) References Cited

U.S. PATENT DOCUMENTS

2015/0333898 A1    11/2015    Ji et al.
2018/0063865 A1*   3/2018    Islam ............... H04W 76/27
(Continued)

FOREIGN PATENT DOCUMENTS

WO    2017037343 A1    3/2017

OTHER PUBLICATIONS

"3GPP TR 38.912 V1.0.0 (Mar. 2017)", 3rd Generation Partnership Project; Technical Specification Group Radio Access Network; Study on New Radio (NR) Access Technology (Release 14), Mar. 2017, pp. 1-74.

(Continued)

*Primary Examiner* — Hassan Kizou
*Assistant Examiner* — Deepa Belur
(74) *Attorney, Agent, or Firm* — Murphy, Bilak & Homiller, PLLC

(57) ABSTRACT

A method performed by a network node (110) for deciding a feedback option of a message sent between the network node (110) and a User Equipment, UE, 120 in a wireless communication network (100) is provided. The message comprises a first data, which is punctured by a second data. The first data is sent in a slot of a radio resource. The second data is sent a mini-slot of the radio resource. The mini-slot is smaller than the slot.
The network node (110) decides (401) a feedback option for feedback that is to be sent to the sender of the message. The deciding is based on any one or more out of: slot control resource capacity, mini-slot control resource capacity and requirements of the radio bearer. The feedback option may relate to any one out of:

(1) Only a slot based channel is used for feedback of both the first data and the second data,
(2) a mini-slot based channel is used for feedback of the second data and a slot based channel is used for feedback of the first data, and (Continued)

US 10,567,135 B2

Page 2

(3) only a mini-slot based channel is used for feedback of both the first data and the second data.

17 Claims, 5 Drawing Sheets

(56) References Cited

U.S. PATENT DOCUMENTS

| | | | |
|---|---|---|---|
| 2018/0220400 A1* | 8/2018 | Nogami | H04L 5/0078 |
| 2018/0255532 A1* | 9/2018 | Li | H04L 5/14 |
| 2018/0262289 A1* | 9/2018 | Li | H04J 11/005 |
| 2018/0270022 A1* | 9/2018 | Sun | H04L 1/1893 |
| 2018/0270800 A1* | 9/2018 | Park | H04W 72/042 |
| 2018/0279291 A1* | 9/2018 | Tiirola | H04L 1/1861 |
| 2018/0279330 A1* | 9/2018 | Hong | H04L 5/0073 |
| 2018/0324852 A1* | 11/2018 | Van Phan | H04L 1/08 |
| 2018/0352601 A1* | 12/2018 | Park | H04W 76/19 |
| 2019/0109692 A1* | 4/2019 | Gao | H04W 72/042 |
| 2019/0222362 A1* | 7/2019 | Beale | H04L 1/1607 |

OTHER PUBLICATIONS

"Discussion on URLLC puncturing of data", 3GPP TSG RAN WG1 AH_NR Meeting; R1.1700688; Spokane, Washington, US, Jan. 16-20, 2017, pp. 1-4.

Unknown, "On eMBB/URLLC multiplexing for uplink", 3GPP TSG-RAN WG1 #88, R1-1701870, Athens, Greece, Feb. 13-17, 2017, 1-2.

Unknown, "Overview of URLLC", 3GPP TSG-RAN WG2 NR Ad Hoc, Tdoc R2-1700393, Spokane, USA, Jan. 17-19, 2017, 1-7.

* cited by examiner

NETWORK NODE AND METHOD IN A WIRELESS COMMUNICATIONS NETWORK

TECHNICAL FIELD

Embodiments herein relate to a first radio node and methods therein. In particular, they relate to selecting a transmission rank in a wireless communications network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

5G currently being studied by 3GPP is targeting a wide range of data services including Enhanced Mobile Broadband (eMBB) and Ultra-Reliable Low Latency Communication (URLLC). URLLC is a new data service with extremely strict error and latency requirements. URLLC will enhance the way of communication with extremely challenging requirements including 1 ms end-to-end radio link latency and guaranteed minimum reliability of 99.999%.

Some of the use cases for URLLC may be robotics, industrial automation, remote surgery and health care, interactive augmented-virtual reality, smart vehicles, transport and infrastructure, drones and aircraft communication, etc.

To enable optimization for different services, the length of the Transmission Time interval (TTI) is expected to vary. For instance, URLLC may have a shorter TTI length than eMBB. URLLC data transmission is supposed to happen as soon as URLLC packet arrives at the transmitter, while at the same time the eMBB transmission may be transmitted or be scheduled to be transmitted. It is therefore desirable to puncture, also referred as interrupt, the eMBB transmission in certain time-frequency resources and perform a ULLRC transmission on those punctured resources.

NR supports slot-based transmissions such as Physical Downlink Shared Channel (PDSCH) and Physical Uplink Shared Channel (PUSCH) Type A and mini-slots and non-slot-based transmissions such as PDSCH and PUSCH Type B.

In the following, the wording mini-slot may refer to PDSCH and/or PUSCH type B. For mini-slot, the transmission may start at any symbol, Demodulation Reference Signals (DMRS) are relative to the transmission start and the length may e.g. be from 1 to 13 symbols. Although the standard has not specifically stated, it is a common practice that URLLC data may utilize mini-slot transmission. On the other hand, slot-based transmission may have 14 OFDM symbols.

In the following, it is implicitly assume that URLLC data uses mini-slot transmission, while eMBB data uses slot transmission.

It has been agreed that for DL in 3GPP, dynamic resource sharing between URLLC and eMBB is supported by transmitting URLLC scheduled traffic, and in particular URLLC transmission on mini-slot transmission may occur in resources scheduled for ongoing eMBB traffic on slot transmission.

In uplink (UL) i.e. from the UE to the gNB, the UE transmits eMBB data, which is punctured by URLLC data transmitted in the resources scheduled for eMBB, as illustrated in FIG. 1. FIG. 1 is an illustration of a URLLC transmission puncturing eMBB data in uplink.

In Downlink (DL) i.e. from the gNB to the UE, the URLLC transmission comprises a control information part comprising De-modulation Reference Signals (DMRS) for demodulation of the control information as well as control information, and a data part comprising DMRS for demodulation of data as well as data. FIG. 2 illustrates a scenario where the eMBB data transmission is punctured by URLLC data in downlink. FIG. 2 is an illustration of a URLLC transmission puncturing eMBB data in downlink.

The reliability of the punctured data will be provided by performing Hybrid Automatic Repeat Request (HARQ) re-transmissions when it is necessary. In many wireless communications systems, HARQ re-transmissions are a method to handle un-predicable interference and channel variations.

The LTE HARQ mechanism, however, comprises multiple stop-and-wait protocols that may be applied in parallel to allow continuous transmission of data. In LTE, for either DL or UL, there is one HARQ entity per serving cell. HARQ processes may belong to the same HARQ entity, but have independent HARQ acknowledgements. Transmission Time interval (TTI) is a parameter in LTE related to encapsulation of data from higher layers into sub frames for transmission on the radio link layer. The TTI such as the subframe has 1 ms duration and the HARQ-Acknowledgement (ACK), for Frequency Division Duplex (FDD), is transmitted in subframe n+4 for a data transmission in subframe n. In LTE uplink, the HARQ retransmission timing is fixed, and the HARQ retransmission process typically takes 8 ms for each retransmission. When a receiver has attempted to decode a data message, it transmits an indicator to the transmitter indicating whether the decoding was successful or not. When the transmitter receives an indicator indicating unsuccessful decoding the transmitter typically performs a re-transmission of the data message which the receiver most likely will soft-combine with the original received transmission.

The fixed HARQ feedback timing is a problem in some implementation scenarios, e.g. with centralized baseband deployment or non-ideal backhaul, and when operating in unlicensed spectrum, e.g. where listen-before-talk sometimes prevents UEs from sending HARQ feedback. 5G shall have a lean and scalable design to be able to cope with various latencies on the transport and radio interface as well as with different processing capabilities on UE and network side.

A NACK referred in the following may be in a DCI-like one to contain one or more of the following info: MCS, redundancy version (RV), NDI, etc as well as any possible indication of physical resource allocation (change).

The HARQ-ACK response send by a network node may e.g. be of either format:

(a) PHICH-like. The DL response to a UL TB tansmission carries only ACK/NACK information, and does not carry full scheduling information like MCS, resource allocation, etc. The advantage of the PHICH-like response is that it has 1-bit payload only, hence very easy to transmit reliably over the air to UE. The disadvantage is that a new physical channel, or a new DCI format, has to be introduced to provide such feedback in NR.

(b) PDCCH-like. As discussed above, the DL response to a UL TB transmission can contain scheduling information rather than simple ACK/NACK information. The advantage is that it can reuse DCI format defined for other traffic (e.g., eMBB) for URLLC traffic as well. The disadvantage is that the DCI payload is much larger, typically in the range of 20-80 bits. The larger payload leads to lower reliability.

To facilitate latency reduction for URLLC traffic, mini-slot-based transmissions of 2 or a few of OFDM symbols are configured. On the other hand, eMBB traffic uses slot transmission with more OFDM symbols such as 7, or longer. URLLC UEs are allocated dedicated Scheduling Request (SR), here called URLLC-SR, resources with a mini-slot periodicity. Note that SRs requires fewer resources than data transmissions as in Semi-Persistent Scheduling (SPS) framework. In addition, the HARQ feedback is sent at a Physical Downlink Control Channel (PDCCH). There are two types of PDCCH: Slot-PDCCH and mini-slot-PDCCH. Mini-slot-PDCCH repeats every mini-slot and can provide fast feedback.

E.g., see Ericsson white paper Uen 284 23-3204 Rev C April 2016.

SUMMARY

An object of embodiments herein is therefore to improve the performance of a wireless communications network using a radio resource with slots punctured by mini-slots.

According to a first aspect of embodiments herein, the object is achieved by a method performed by a network node for deciding a feedback option of a message sent between the network node and a User Equipment, UE, in a wireless communication network. The message comprises a first data, which is punctured by a second data. The first data is sent in a slot of a radio bearer, and the second data is sent a mini-slot of the radio bearer. The mini-slot is smaller than the slot. The network node decides a feedback option for feedback that is to be sent to the sender of the message. The deciding is based on any one or more out of: slot control resource capacity, mini-slot control resource capacity and requirements of the radio bearer. The feedback option relate to any one out of:

(1) Only a slot based channel is used for feedback of both the first data and the second data, (2) a mini-slot based channel is used for feedback of the second data and a slot based channel is used for feedback of the first data, and (3) only a mini-slot based channel is used for feedback of both the first data and the second data.

According to a second aspect of embodiments herein, the object is achieved by a method performed by a network node for deciding a feedback option of a message sent between the network node and a User Equipment, UE, in a wireless communication network. The message is configured to comprise a first data, which is to be punctured by a second data. The first data is to be sent in a slot of a radio bearer. The second data is to be sent in a mini-slot of the radio bearer. The mini-slot is smaller than the slot.

The network node is configured to decide a feedback option for feedback that is to be sent to the sender of the message. The deciding is to be based on any one or more out of: slot control resource capacity, mini-slot control resource capacity and requirements of the radio bearer, and wherein the feedback option is configured to relate to any one out of:

(1) Only a slot based channel is to be used for feedback of both the first data and the second data, (2) a mini-slot based channel is to be used for feedback of the second data and a slot based channel is used for feedback of the first data, and (3) only a mini-slot based channel is to be used for feedback of both the first data and the second data.

An advantage of embodiments herein is that they enable a receiver to feedback the transmitted status whether correctly decoded or not of both first data and second data. In addition, three options may offer different performance in terms of URLLC latency improvement, eMBB latency improvement, and a reduction of control channel overhead.

BRIEF DESCRIPTION OF THE DRAWINGS

Examples of embodiments herein are described in more detail with reference to attached drawings in which.

DETAILED DESCRIPTION

Figure 1:
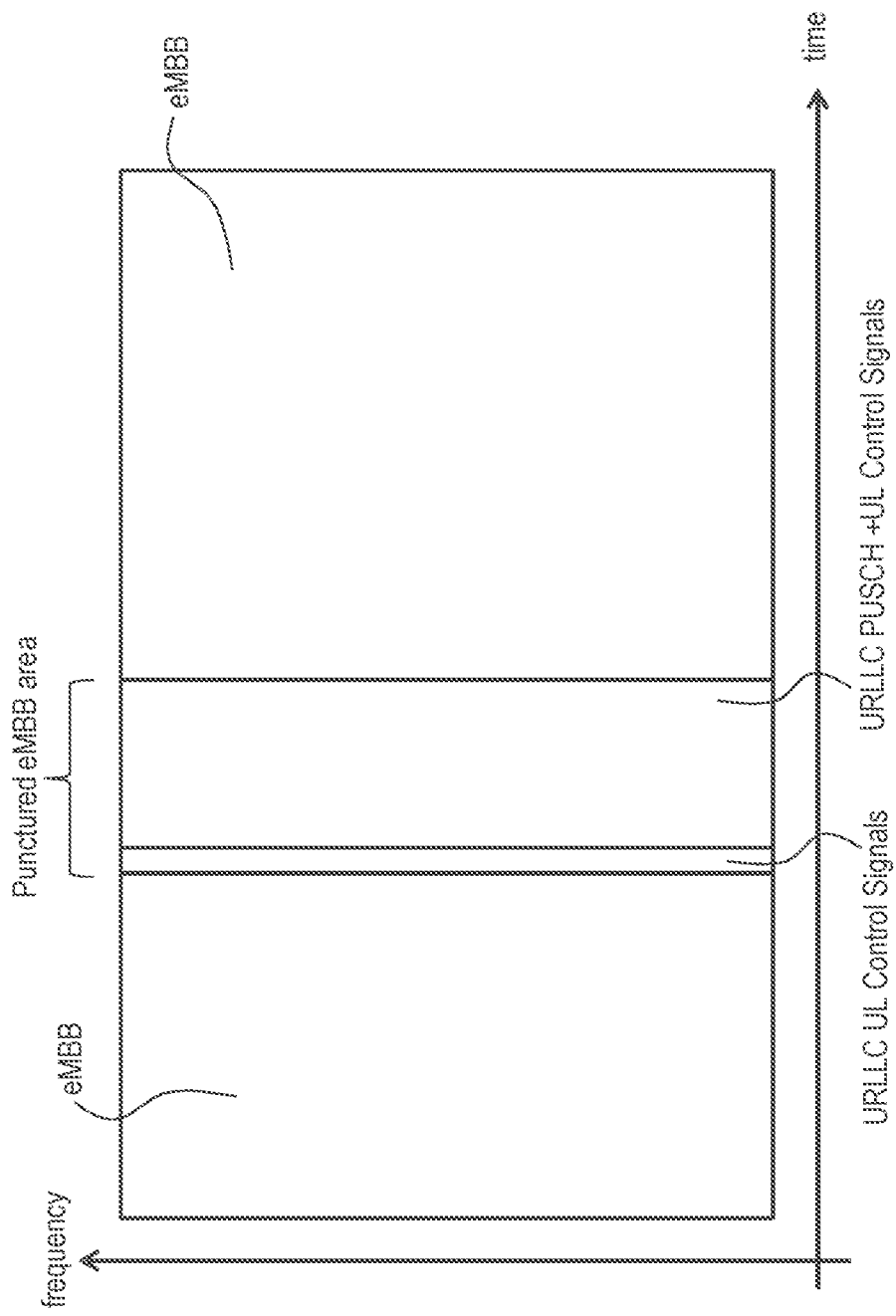
FIG. 1 is a schematic block diagram prior art.
Figure 2:
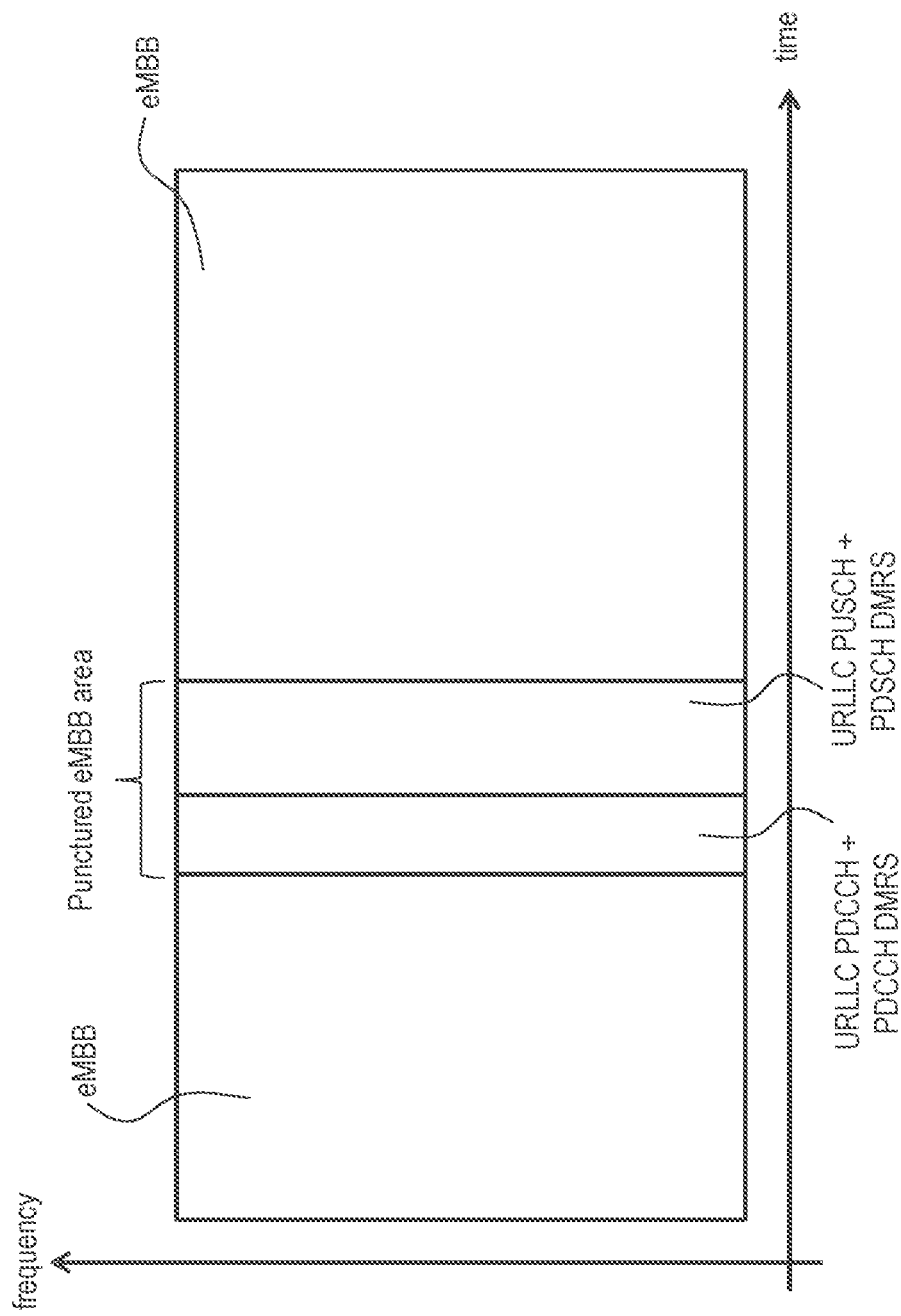
FIG. 2 is a schematic block diagram prior art.

As part of developing embodiments herein, the inventors recognized a problem, which first will be discussed.

Upon receiving URLLC data within a punctured eMBB Transport Block (TB), for a certain HARQ process, the receiver tries to decode the eMBB data in the TB and informs the transmitter about the outcome through a HARQ acknowledgement, indicating whether the TB was correctly decoded or not. However, this indication will be only for the eMBB data, and there is not any indication for the URLLC data delivered within the punctured eMBB area. The transmitting part therefore does not know if the decoding of URLLC data was successful or not at the receiving part which may lead to significant problems in case of service reliability and performance degradation of URLLC if successful transmission is assumed, and unnecessary re-transmission and special inefficiency if unsuccessful transmission is assumed. Furthermore, the receiver may not determine that there was any URLLC data in the punctured eMBB.

An object of some embodiments herein is therefore to introduce a set of correct HARQ feedback operations in a case with slots punctured by mini-slots. At the same time, some feedback options are configurable so that performance of a wireless communications network using a radio resource with slots punctured by mini-slots can be improved in different scenarios. In some options, a control channel overhead is reduced, while in some other options, the latency of either or both of URLLC and eMBB data is improved.

Some embodiments herein relate to UL HARQ for puncturing URLLC within eMBB such as intra-UE UL URLLC puncturing of the mini-slot transmission within the slot transmission.

However, the embodiments herein may both relate to DL and UL feedback for puncturing of the mini-slot transmission within the slot transmission.

Embodiments herein facilitate latency reduction for traffic comprising first data such as e.g. eMBB data, which is punctured by second data such as URLLC data. More specifically, in some embodiments only the latency of the second data is reduced. The first data may be sent in a slot of a radio resource and the second data may be sent a mini-slot of the radio resource. The mini-slot is smaller than the slot.

A network node such as a gNB decides a feedback option for feedback that is to be sent to the sender of the message. The deciding is based on slot control resource capacity, mini-slot control resource capacity and/or requirements of the radio bearer. The feedback option relate to any one out of:

(1) only a slot based channel is used for feedback of both the first data and the second data, (2) a mini-slot based channel is used for feedback of the second data and a slot based channel is used for feedback of the first data, and (3) only a mini-slot based channel is used for feedback of both the first data and the second data.

According to an example embodiment, where mini-slot-based transmissions of 2 or a few of OFDM symbols are configured while eMBB data uses slot transmission with more OFDM symbols e.g. 7, or even longer. In this case there are three different options for the receiver to provide feedback transmissions for the URLLC data as well as the eMBB data:

(1) Only slot-PDCCH is used for feedback, and rescheduling of both mini-slot and slot-level TBs, and e.g. grant for eMBB retransmissions.

(2) Mini-slot-PDCCH and slot-PDCCH based feedback is used for mini-slot Physical Uplink Shared Channel (PUSCH) and slot-PUSCH_and their re-scheduling, respectively.

(3) Only mini-slot-PDCCH is used for the feedback, and e.g. the acknowledgement or rescheduling of both mini-slot and slot-level TBs.

To provide such as ensure the appropriate HARQ operation for punctured TB, embodiments herein provide a feedback channel selection method such as e.g. a HARQ feedback channel selection method to enable the receiver to feedback the transmitted status such as e.g. acknowledge, whether correctly decoded or not, of both first data and second data such as the punctured eMBB TB, and the URLLC data TB which is transmitted within the punctured eMBB area. In addition, the feedback channel or channels may be used to provide UL grant for re-transmissions for some embodiments.

Figure 3:
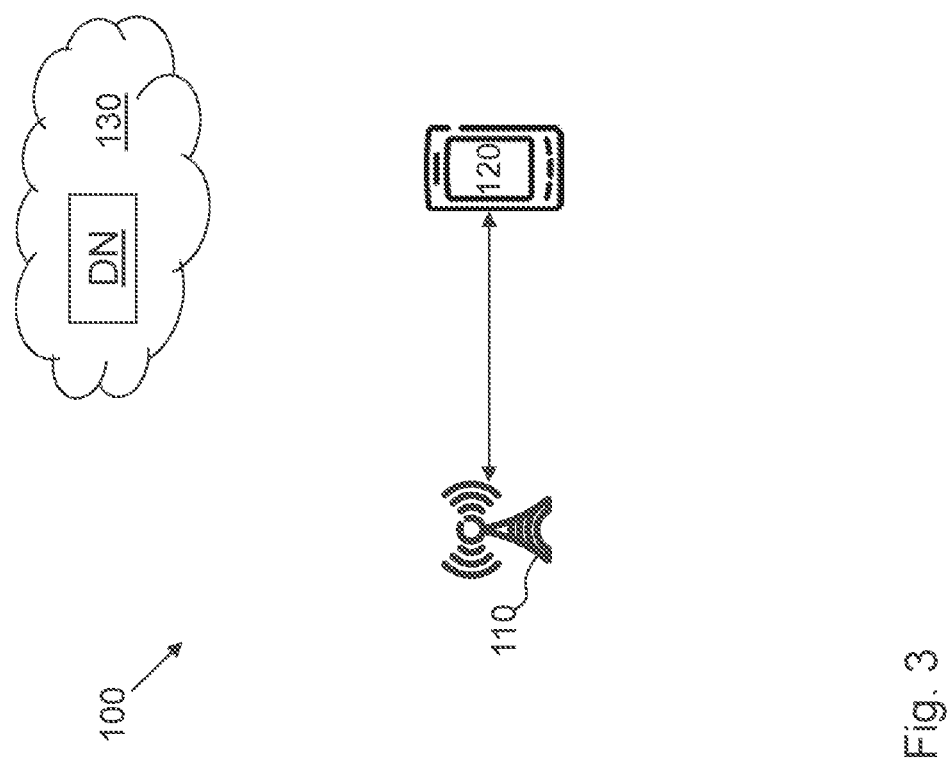
FIG. 3 is a schematic block diagram depicting embodiments of a wireless communications network.

FIG. 3 depicts an example of a wireless communications network 100 in which embodiments herein may be implemented. The wireless communications network 100 implementing embodiments herein may comprise one or more RANs and one or more CNs. The wireless communication network 100 may use a number of different technologies, such as Wi-Fi, Long Term Evolution (LTE), LTE-Advanced, 5G, Wideband Code Division Multiple Access (WCDMA), Global System for Mobile communications, enhanced Data rate for GSM Evolution (GSM/EDGE). Worldwide interoperability for Microwave Access (WiMax), or Ultra Mobile Broadband (UMB), just to mention a few possible implementations. Some embodiments herein may relate to recent technology trends that are of particular interest in a 5G context, e.g. comprising a NR and LTE context, such as eMBB and URLLC. However, embodiments are also applicable in further development of other existing wireless communication systems such as e.g. WLAN, WCDMA.

A number of network nodes operate in the wireless communication network 100, whereof one, a network node 110 is depicted in FIG. 3. The network node 110 provides radio coverage over a geographical area. The network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, epode B), a 5G base station such as a gNB, a base transceiver station, a radio remote unit, an Access Point Base Station, a base station router, a transmission arrangement of a radio base station, a stand-alone access point or any other network unit capable of communicating with a User Equipment (UE) within the service area served by the network node 110 depending on the radio access technology and terminology used. The network node 110 may be referred to as a serving radio network node and communicates to a UE 120 with DL transmissions and from the UE 120 in Uplink (UL) transmissions.

In the wireless communication network 100, radio nodes such as e.g. the UE 120 operate. The UE 120 may be a wireless device, a mobile station, a non-access point (non-AP) STA, a STA, a user equipment and/or a wireless terminals, communicate via one or more Access Networks, e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The UE 120 and the network node 110 may e.g. use multiple HARQ processes for transmission.

Methods for deciding a feedback option of a message sent between the network node 110 and the UE 120 is performed by the network node 110 and the wireless device 120. As an alternative, a Distributed Node (DN) and functionality, e.g. comprised in a cloud 130 as shown in FIG. 3, may be used for performing or partly performing the methods.

Figure 4:
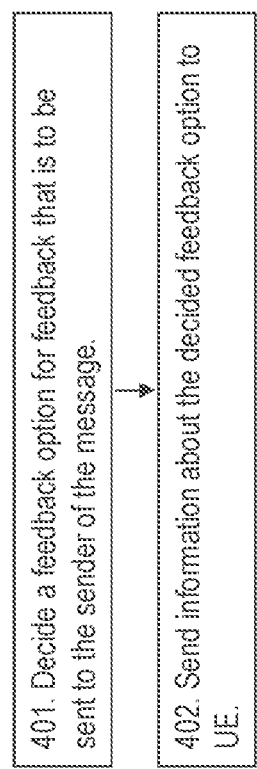
FIG. 4 is a flowchart illustrating embodiments of method in a network node.

Example embodiments of a flowchart depicting embodiments of a method performed by the network node 110 such as the gNB for deciding a feedback option of a message sent between the network node 110 and the UE 120 in the wireless communication network 100 is depicted in FIG. 4. The message comprises a first data e.g. eMBB which is punctured by a second data e.g. URLLC. The first data is sent in a slot of a radio resource, wherein the second data is sent a mini-slot of the radio resource, and wherein the mini-slot is smaller than the slot.

Thus, the first data may comprise eMBB data, which is punctured by the second data comprising URLLC data.

The slot based channel may be a slot-PDCCH, and the mini-slot based channel may be a mini-slot-PDCCH The method actions may be taken in any suitable order.

Action 401

In an example scenario, the network node 110 receives the message from the UE 120, but it may be the other way around, the message may be sent by the network node 110 and received by the UE 120. A suitable feedback option to be used for sending feedback related to the message needs to be decided. In the example scenario, the feedback is to be sent by the network node 110 to the UE 120. However it may be the other way around, the feedback may be sent by the UE 120 and be received by the network node 110.

The network node 110 thus decides a feedback option for feedback that is to be sent to the sender of the message.

The deciding is based on any one or more out of: slot control resource capacity, mini-slot control resource capacity and requirements of the radio bearer, e.g. latency requirements. The feedback option may relate to any one out of:

(1) Only a slot based channel is used for feedback of both the first data and the second data, (2) a mini-slot based channel is used for feedback of the second data and a slot based channel is used for feedback of the first data, and (3) only a mini-slot based channel is used for feedback of both the first data and the second data.

The deciding of the feedback option may further comprise deciding a timing and expected feedback for the decided option. This may be performed by Radio Resource Control (RRC) configuration.

The network node 110 may decide option (1). It has an advantage since there is no need to specify a mini-slot based control, i.e., the control overhead is reduced. Option (1) may be decided according to any one or more out of:

When an immediate feedback for the URLLC data is not necessary.

When the feedback on a slot based channel does not have negative effects on the URLLC performance, e.g. when the puncturing URLLC data is close to the end of the slot, and when a bundled puncturing of multiple URLLC data is close to the end of the slot. In both examples, the slot-based feedback channel is very close in time. The puncturing URLLC data comprises the bundled puncturing of multiple URLLC data. Bundled puncturing of multiple URLLC data may mean puncturing multiple times.

The network node 110 may decide option (2). It has an advantage that the feedback time for URLLC is the fastest so that the latency target is reached. Option (2) may be decided according to any one or more out of:

When the immediate feedback for the URLLC data is essential to fulfil an URLLC performance.

When the puncturing URLLC data is close to the start of the slot. This is an advantage since otherwise it has to wait until the end of the slot for a feedback.

Further, the network node 110 may decide option (3). It has an advantage that the feedback time for eMBB may also be fast. It is decided according to any one or more out of:

When the Mini-slot-PDCCH has the capacity to send both feedbacks, and

When the immediate feedback for eMBB data is useful, e.g. to reduce the latency but still crucial enough to label as URLLC data.

If, chosen, to enable the UE 120 to prepare and re-transmit an eMBB packet comprising the eMBB data immediately in the next slot so that the latency is reduced.

Action 402

The network node may further send information about the decided feedback option to the UE 120. This may e.g. be to configure the UE 120 with the decided option.

Figure 5:
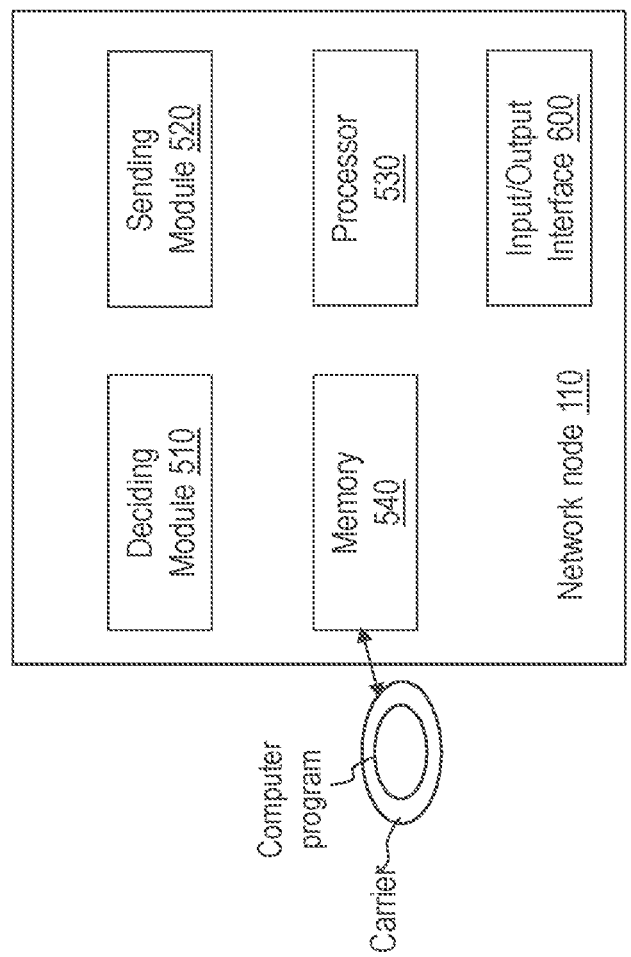
FIG. 5 is a schematic block diagram illustrating embodiments of a network node.

FIG. 5 is a schematic block diagram depicting the network node 110.

To perform the method actions for or deciding a feedback option of a message sent between the network node 110 and the UE 120 in the wireless communication network 100, the network node 110 may comprise the arrangement depicted in FIG. 5.

The message is configured to comprise a first data, which is to be punctured by a second data. The first data is to be sent in a slot of a radio bearer. The second data is to be sent in an mini-slot of the radio bearer. The mini-slot is smaller than the slot.

The first data may be configured to comprise eMBB data which is punctured by the second data comprising URLLC data.

The slot based channel may be configured to be a slot-PDCCH, and the mini-slot based channel may be configured to be a mini-slot-PDCCH.

The network node 110 is configured to e.g. by means of a deciding module 510 configured to, decide a feedback option for feedback that is to be sent to the sender of the message. The deciding is based on any one or more out of: slot control resource capacity, mini-slot control resource capacity and requirements of the radio bearer. The feedback option is configured to relate to any one out of:

(1) only a slot based channel is to be used for feedback of both the first data and the second data, (2) a mini-slot based channel is to be used for feedback of the second data and a slot based channel is used for feedback of the first data, and (3) only a mini-slot based channel is to be used for feedback of both the first data and the second data.

The network node 110 may further be configured to e.g. by means of the deciding module 510 further configured to, decide a feedback option by deciding a timing and expected feedback for the decided option.

The network node 110 may further be configured to e.g. by means of a sending module (520) configured to, send information about the decided feedback option to the UE 120.

The network node 110 may further be configured to decide option (1) according to any one or more out of: When an immediate feedback for the URLLC data is not necessary, when the puncturing URLLC data is dose to the end of the slot, and when a bundled puncturing of multiple URLLC data is dose to the end of the slot, wherein the puncturing URLLC data comprises the bundled puncturing of multiple URLLC data.

The network node 110 may further be configured to decide option (2) according to any one or more out of: When the immediate feedback for the URLLC data is essential to fulfil are URLLC performance, and when the puncturing URLLC data is close to the start of the slot.

The network node 110 may further be configured to decide option (3) according to any one or more out of: When the immediate feedback for eMBB data is useful, and if chosen, to enable the UE 120 to prepare and re-transmit an eMBB packet comprising the eMBB data immediately in the next slot.

Embodiments herein such as mentioned above will now be further described and exemplified. The text below is applicable to and may be combined with any suitable embodiment described above.

According to an example scenario, the network node 110 decides which of the three options to use. The decision is e.g. based on slot control resource capacity, mini-slot control resource capacity, and/or latency requirement of the traffic and/or Quality of Service (QoS) of radio bearers or above mentioned basis. In general, a RAN, such as the network node 110 decides which of the three options such as e.g. three configurations to use e.g. via a RRC signaling to instruct the UE 120.

Both the UE 120 and the network node 110 may be configured with the decided feedback transmission option such as any of:

(1) Only a slot based channel is used for feedback of both the first data and the second data such as only slot-PDCCH is used for feedback, grant for eMBB retransmissions, (2) a mini-slot based channel is used for feedback of the second data and a slot based channel is used for feedback of the first data such as Mini-slot-PDCCH and slot-PDCCH based feedback for mini-slot PUSCH and slot-PUSCH, respectively, and (3) only a mini-slot based channel is used for feedback of both the first data and the second data such as only mini-slot-PDCCH is used for the acknowledgement or rescheduling of both mini-slot and slot-level TBs.

The network node 110 may instruct the UE 120 which option that is decided for the feedback and in this way configure the DE 120 with the decided option, e.g. with preference from a network vendor perspective, either by a UE-specific and/or non-specific configuration RRC signaling or by a Medium Access Control (MAC) control element instruction.

Both the UE 120 and the network node 110 may be a sender of the second data e.g. URLLC data and the first data e.g. eMBB data to be fed back.

Thus, the UE 120 may be a sender of the second data e.g. URLLC data and the first data e.g. eMBB data to be fed back by the network node 110.

Thus, the network node 110 may be a sender of the second data e.g. URLLC data and the first data e.g. eMBB data to be fed back by the UE 120.

This means that any of the network node 110 and the UE 120 may send the feedback, e.g. the network node 110 sends feedback such as ACKs for UL data, and the UE 120 sends feedback such as ACKs for DL data.

The three options will be described below, which refer to:

(1) Only a slot based channel is used for feedback of both the first data and the second data, (2) a mini-slot based channel is used for feedback of the second data and a slot based channel is used for feedback of the first data, and (3) only a mini-slot based channel is used for feedback of both the first data and the second data.

The feedback may be sent as a feedback indication.

Option (1): Only a Slot Based Channel is Used for Feedback of Both the First Data e.g. eMBB Data and the Second Data e.g. URLLC Data.

This option may e.g. be enabled when the immediate feedback for URLLC traffic i.e. the URLLC data traffic, is not necessary, and the feedback on slot based channel does not have negative effects on the URLLC performance. It should be noted that the wording "traffic" when used herein may be used interchangeably with any of the wordings "data" and "data traffic". For example, this option (1) may be enabled when the puncturing URLLC traffic, e.g. including multiple consecutive puncturing of the same transport block, i.e., bundled puncturing is dose to the end of the slot, this is since the slot-based feedback channel has been defined and is very close in time. According to an example scenario of deciding option (1), only a Slot-PDCCH is used for one feedback of both the first data e.g. eMBB and the second data e.g. URLLC. The feedback may be sent in a grant for retransmission (reTx). In this option (1), for the URLLC uplink traffic, the HARQ acknowledgement of a mini-slot transmission may be expected in a next slot-PDCCH. Either a NACK, which is a UL grant for a retransmission of the URLLC TB or an ACK in case of successful reception is expected. A NACK indicates that a retransmission is needed and should use one or several coming UL mini-slots for the URLLC retransmission as it did in the first transmission. At the presence of such URLLC TB, if error of a transmission granted by a slot-PDCCH DCI happens, slot-based transmissions e.g. granted by slot-PDCCH DCI, normally may be acknowledged in a later slot-PDCCH by a UL grant after the next one. In cases of a successful reception, then no acknowledgement should be expected.

An advantage with the optic (1) is that there is only one channel for the feedback so that radio resources are efficiently utilized, and the UE 120 does not need to monitor mini slot PDCCH so that the complexity is reduced.

Option (2) a Mini-Slot Based Channel is Used for Feedback of the Second Data URLLC Data and a Slot Based Channel is Used for Feedback of the First Data e.g. eMBB Data.

In an example embodiment of option (2), Mini-slot-PDCCH based feedback is used for mini-slot PUSCH and a slot-PDCCH based feedback is used for slot-PUSCH.

This option may be enabled when the immediate feedback for URLLC traffic is essential to fulfil the URLLC performance. For example, this option may be enabled when the punctured URLLC traffic is close to the start of the slot, this is since the slot-based channel feedback is not available at least until the slot transmission finishes, which may introduce long feedback latency if option (1) is adopted.

In this example of using option (2), there are $2^2$ different HARQ decoding results for the second data, in this example URLLC data, and the first data, in this example eMBB data, as well as each result may be handled in a different way as shown by Table 1.

TABLE 1

Separate feedback for the second data, in this example URLLC data (mini-slot PUSCH) and first data, in this example eMBB data (slot PUSCH) in the different cases b1-b4.

| | URRLC TB decoding result (transmission granted by mini-slot PDCCH) | eMBB TB decoding result (transmission granted by slot-PDCCH) | Action at the network node 110 such as the gNB |
|---|---|---|---|
| Case b1 | NO | NO | Provide immediate uplink grant on separate mini-slot PDCCH for the URLLC retransmission<br>Via slot-level PDCCH for eMBB, schedule a ReTx at any consequent slot-PDCCH |
| Case b2 | YES | NO | Send ACK via mini-slot PDCCH for the URLLC<br>Via slot-level PDCCH, schedule ReTx for eMBB at any consequent slot-PDCCH |
| Case b3 | NO | YES | Provide immediate uplink grant via a separate mini-slot PDCCH for the URLLC retransmission<br>Send ACK via slot-level PDCCH for the eMBB |
| Case b4 | YES | YES | Send ACK via mini-slot PDCCH for the URLLC<br>Send ACK via slot-level PDCCH for the eMBB |

An advantage with this option (2) is that an immediate feedback for URLLC traffic is possible so that more transmissions with link adaptation can be feasible.

Option (3) Only a Mini-Slot Based Channel is Used for Feedback of Both the First Data e.g. eMBB Data and the Second Data e.g. URLLC Data.

This option may be enabled when the immediate feedback for eMBB traffic is useful. For example, an early feedback for eMBB traffic may enable the UE 120 to prepare and re-transmit the eMBB packet immediately in the next slot. In addition, slot-level TB transmission may use mini-slot-PDCCH for its constituent Code Block (CB)'s feedback.

A transport block is the main data unit in LTE physical layer. The physical layer gets the TB from MAC as payload. The TB is divided into CBs, if the size of the TB is greater than or equal to 6144 bits. Therefore, there may be a maximum of 7 code blocks per TB for the largest TB size.

In an example scenario of option (2), only mini-slot-PDCCH is used for ACK or rescheduling both mini-slot and slot-level TBs.

In this option, acknowledgement on a mini-slot and slot-level TB transmission may be expected in a next mini-slot-PDCCH as long as the PDCCH capacity allows. Slot-level TB transmission may use mini-slot-PDCCH for its constituent CBs feedback or an early feedback in the case of URLLC puncturing before the whole eMBB TB decoding is completed.

To avoid any ambiguity, the indication for the reception status such as the feedback indication, may follow the same time order, e.g. sequential order, as the TB and/or CB is finally received. Moreover, if TB and/or CB are both received at the same time at a mini-slot level, a mini-slot TB such as an URLLC TB, is acknowledged before a slot transmission CB such as an eMBB CB. Either a NACK, which is a UL grant for a retransmission of the URLLC-TB or eMBB-CB, or an ACK in case of successful reception is sent in a TB and CB or in a Code Block group (CBG). A CBG is a group comprising one or more CBs. One TB carries one or multiple CB(s) or CBG(s) with Cyclic Redundancy Checking (CRC) bits.

eMBB CBs may not be acknowledged individually. HARQ-ACK is sent for a CBG when multi-bit HARQ-ACK is sent. See 3GPP RAN1 working assumption below.

RAN 1 Working assumption:

CBG-based transmission with single/multi-bit HARQ-ACK feedback is supported in Release-15 of 3GPP, which shall have the following characteristics:

Only allow CBG based (re)-transmission for the same TB of a HARQ process

CBG can include all CB of a TS regardless of the size of the TS—In such case, UE 120 reports single HARQ ACK bits for the TB CBG can include one CB CBG granularity is configurable Pre-Configuration on Protocol Between the UE 120 and the Network Node 110.

According to some embodiments herein, a pre-configuration on a feedback channel according to the decided option may be performed before any of the possible transmission of the first data punctured by a second data. A pre-configuration on the feedback channel may e.g. be on a HARQ feedback channel. The pre-configuration may comprise timing and expected feedback. The first data punctured by a second data may e.g. be URLLC transmission in punctured eMBB.

Note that the wording "pre-configuration" is also referred to as configuration below.

In the examples below, the first data relates to eMBB data and is sent in a slot of a radio resource, and the second data relates to URLLC data and is sent a mini-slot of the radio resource. However, other examples of first data sent in a slot of a radio resource and second data sent a mini-slot of the radio resource may be applicable.

The pre-configuration may in some embodiments be performed in the network node 110 deciding one of the options and by informing the UE 120 about the decided option and thereby pre-configuring the UE 120.

The pre-configuration on the feedback channel, timing and expected feedback may e.g. be absenteeism of ACK or mandatory ACK, or NACK with a UL grant for retransmission (reTx).

The configuration may e.g. be carried out via an RRC instruction when setting up a new radio bearer for URLLC services between the network node 110 and the UE 120. Another alternative is one default configuration per the URLLC QoS class e.g. to be determined in a standard specification related to URLLC. Besides, any change of the feedback behaviour such as the HARQ feedback behaviour may be subject to RRC/MAC instructions.

It is worth noting that all the transmissions at a slot resource are granted by the network node 110 such as a gNB before it happens. In other words, the network node 110 naturally is aware of transmission events. Thereby, in the UL, a successful decoding and transmission of an ACK to a UE such as the UE 120 may be a less important case compared to a failure of decoding and providing a NACK feedback together with a retransmission grant. For the granted UL resources, with a New Data Indicator (NDI), the network node 110 indicates to the UE 120 whether it demands a new TB or retransmission of current TB.

In contrary, for the URLLC puncturing based Transmission (TX), it happens without such a granting process beforehand. Furthermore, the network node 110 may not be supposed to be aware of such puncturing based transmission before a correct detection of mini-slot PUCCH or any signal features due to puncturing.

See the following example explaining the difference between grant free and grant based transmission. For UL transmission that is always scheduled by DCI, the acknowledgement from the network node 110 may be omitted if HARQ-ACK='ACK', since the UE 120 does not retransmit autonomously even when no acknowledgment is received from the network node 110. That is, the UE 120 is expected to assume HARQ-ACK='ACK' when no acknowledged is received from the network node 110.

In contrast, for grant-free UL data, the UE 120 will retransmit autonomously when no acknowledgment is received from network node 110, since the UE 120 assumes the network node 110 missed the PUSCH, if no acknowledgment is received from network node 110, the UE 120 cannot distinguish between these cases:

(a) the network node 110 missed the PUSCH transmission completely; the network node 110 was not aware of the UL TB transmission and send no feedback;

(b) the network node 110 received the PUSCH transmission, but the decoding of UL TB was unsuccessful. The network node 110 sends an NACK, but the NACK was not received correctly by the UE 120;

(c) the network node 110 received the PUSCH transmission, the decoding of UL TB was successful.

Hence, if (c), then the network node 110 should send an HARQ-ACK='ACK', so that the UE 120 does not autonomously retransmit. If no acknowledgment is received from network node 110, the UE 120 assumes that retransmission is necessary, i.e. either (a) or (b) occurred.

The possibility that the network node missed the URLLC TX and that the UE 120 is uncertain about whether the network node 110 is aware of the URLLC transmission conducted, and whether the network node 110 has decoded the URLLC data successfully or not, this uncertain scenario is avoided according to embodiments herein.

Thus, for URLLC TX, an ACK may be mandatory for the UE 120 to ensure that the decoding of uplink URLLC data was completed without any error. Thus, an explicit, mandatory ACK is sent. On the other hand, if the UE 120 does not receive such a feedback such as an ACK or a new grant, or NACK at the preconfigured channel and timing, the UE 120 will be ensured that the last TB transmitted is missed by network node. In this case, a proper procedure may be triggered to enable the UE 120 to deal with the miss-detection of the TB. In such a way, the transmission and reception status of the URLLC data between the UE 120 and network node 110 is clearly shared and synchronized.

Acknowledgement of Repeated UL TB

To improve UL TB reliability, the UL TB may be repeated by the UE 120 R times, where R is selected from a set of possible repetitions, e.g., {R0, R1, . . . , Rn−1}. The set {R0, R1, . . . , Rn−1} may be predefined in specification, or configured via higher layer signaling like RRC.

Although the UL TB is repeated R times, only one HARQ-ACK is necessary from the network node 110. For example, if {R0, R1, . . . , Rn−1}={0,2,3,4}, and the UE 120 decides to repeat the UL TB R=3 times to improve reliability, the network node 110 does not need to send 3 HARQ-ACK, one for each UL transmission. Instead, the network node 110 only sends one HARQ-ACK to acknowledge the given TB. On the other hand, it is also acceptable that the network node 110 sends 3 HARQ-ACK, one for each UL transmission, if it is desirable to improve the likelihood that UE 120 successfully receives the HARQ-ACK from network node 110 such as the gNB.

To reduce latency, the network node 110 may transmit HARQ-ACK (='ACK') I.e. 'Acknowledged' and not Non-acknowledged "HACK", on the downlink immediately after the UL TB is successfully received. That is, the network node 110 does not need to wait for detection of all R copies of the UL transmission. For example, if {R0, R1, . . . , Rn−1}={1,2,3,4}, and the UE 120 decides to repeat the UL TB R=3 times to improve reliability, the network node 110 may send back HARQ-ACK='ACK' immediately after receiving one copy (R'=1) of the UL TB, if the reception was successful. On the other hand, if the network node 110 has monitored the maximum possible of R=Rn−1=4 repetitions of the TB, and the reception is still a failure, then the network node 110 sends HARQ-ACK='NACK') on the downlink after the monitoring of R=4 repetitions.

Since the HARQ-ACK timing on the DL is not fixed (i.e., timing depends on whenever network node 110 reception is successful), the UE 120 should start monitoring acknowledgment on the DL at the earliest possible time when network node 110 may send the HAR-ACK. The UE 120 should continuously monitor the acknowledgment on the DL until the acknowledgment is received successfully, or the reception window has ended.

Embodiments herein ensure the transmission and reception status of the URLLC data between the UE 120 and network node 110 is cleary shared and synchronized. Embodiments herein wipe out the hidden problems e.g. missing URLLC data as well as renders the URLLC data transmission more reliable.

Below some example Embodiments 1-10 are described:

The following embodiments refer to FIG. 3, FIG. 4 and FIG. 5.

Embodiment 1. A method performed by a network node 110 for deciding a feedback option of a message sent between the network node 110 and a User Equipment, UE, 120 in a wireless communication network 100, which message comprises first data, which is punctured by a second data, wherein the first data is sent in a slot of a radio resource, wherein the second data is sent a mini-slot of the radio resource, and wherein the mini-slot is smaller than the slot, the method may comprise:

deciding 401 a feedback option for feedback that is to be sent to the sender of the message, which deciding is based on any one or more out of: slot control resource capacity, mini-slot control resource capacity and requirements of the radio bearer, and wherein the feedback option may relate to any one out of:

(1) only a slot based channel is used for feedback of both the first data and the second data, (2) a mini-slot based channel is used for feedback of the second data and a slot based channel is used for feedback of the first data, and (3) only a mini-slot based channel is used for feedback of both the first data and the second data, Embodiment 2. The method according to embodiment 1, further comprising:

sending 402 information about the decided feedback option to the UE 120.

Embodiment 3. The method according to any of the embodiments 1-2, wherein the first data comprises Enhanced Mobile Broadband, eMBB, data which is punctured by the second data comprising Ultra-Reliable Low Latency Communication, URLLC, data.

Embodiment 4. The method according to any of the embodiments 1-3, wherein the slot based channel is a slot-PDCCH, and wherein the mini-slot based channel is a mini-slot-PDCCH.

Embodiment 5. The method according to any of the embodiments 1-4, wherein:

deciding 401 a feedback option further comprises deciding the timing and expected feedback for the decided option.

Embodiment 6. A computer program comprising instructions, which when executed by a processor, cause the processor to perform actions according to any of the embodiments 1-6.

Embodiment 7. A carrier comprising the computer program of embodiments 7, wherein the carrier is one of an electronic signal, an optical signal, an electromagnetic signal, a magnetic signal, an electric signal, a radio signal, a microwave signal, or a computer-readable storage medium.

Embodiment 8. A network node 110 for deciding a feedback option of a message sent between the network node 110 and a User Equipment, UE, 120 in a wireless communication network 100, which message is configured to comprise a first data which is to be punctured by a second data, wherein the first data is to be sent in a slot of a radio resource, wherein the second data is to be sent in an mini-slot of the radio resource, and wherein the mini-slot is smaller than the slot, the network node 110 being configured to e.g. by means of a deciding module 510 configured to, decide a feedback option for feedback that is to be sent to the sender of the message, which deciding is based on any one or more out of: slot control resource capacity, mini-slot control resource capacity and requirements of the radio bearer, and wherein the feedback option is configured to relate to any one out of:

(1) only a slot based channel is to be used for feedback of both the first data and the second data, (2) a mini-slot based channel is to be used for feedback of the second data and a slot based channel is used for feedback of the first data, and (3) only a mini-slot based channel is to be used for feedback of both the first data and the second data.

The deciding module 510 may be comprised in the network node 110.

Embodiment 9. The network node 110 according to embodiment 8, wherein:

the network node 110 is configured to e.g. by means of a sending module 520 configured to send information about the decided feedback option to the UE 120.

The sending module 520 may be comprised in the network node 110.

Embodiment 10. The network node 110 according to any of the embodiments 8-9, wherein the first data is configured to comprise Enhanced Mobile Broadband, eMBB, data which is punctured by the second data comprising Ultra-Reliable Low Latency Communication, URLLC, data.

Embodiment 11. The network node 110 according to any of the embodiments claims 8-10, wherein the slot based channel is configured to be a slot-PDCCH, and wherein the mini-slot based channel is configured to be a mini-slot-PDCCH.

Embodiment 12. The method according to any of the embodiments claim 8-11, wherein:

the network node 110 further is configured to e.g. by means of the deciding module (510) further configured to, decide a feedback option by deciding a timing and expected feedback for the decided option.

The network node 110 comprises an input and output interface 500 configured to communicate with the UE 120. The input and output interface 500 may comprise a wireless receiver (not shown) and a wireless transmitter (not shown).

The embodiments herein for deciding a feedback option of a message sent between the network node 110 and a UE 120 may be implemented through a processor or one or more processors, such as the processor 530 of a processing circuitry in the network node 110 depicted in FIG. 5 together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 440 comprising one or more memory units. The memory comprises instructions executable by the processor in the network node 110.

The memory is arranged to be used to store e.g. feedback options, information, data, configurations, and applications to perform the methods herein when being executed in the network node 110.

In some embodiments, a respective computer program comprises instructions, which when executed by the respective at least one processor, cause the at least one processor of the network node 110 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the network node 110, described above may refer to a combination of analog and digital circuits, and/or one or more processors configured with software and/or firmware, e.g. stored in the network node 110, that when executed by the respective one or more processors such as the processors described above. One or more of these processors, as well as the other digital hardware, may be included in a single Application-Specific integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| ABBREVIATIONS | |
|---|---|
| Abbreviation | Explanation |
| ACK | Acknowledgement |
| DCI | Downlink Control Information |
| DMRS | Demodulation Reference Signal |
| HARQ | Hybrid Automatic Repeat Request |
| eMBB | Enhanced Mobile Broadband |
| NAK/NACK | Negative Acknowledgement |
| URLLC | Ultra Reliable Low Latency Communication |
| UL | Uplink |
| SR | Scheduling request |
| SPS | Semi-persistent scheduling |
| NDI | Next data indicator |
| TB | Transport block |
| CB | Code block |
| PDCCH | Physical Downlink Control Channel |
| PUSCH | Physical Uplink Shared Channel |

The invention claimed is:

1. A method performed by a network node for deciding a feedback option of a message sent between the network node and a User Equipment (UE) in a wireless communication network, the message comprising a first data punctured by a second data, wherein the first data is sent in a slot of a radio bearer and the second data is sent a mini-slot of the radio bearer, and wherein the mini-slot is smaller than the slot, the method comprising:
 deciding a feedback option for feedback that is to be sent to the sender of the message, wherein deciding is based on at least one of: slot control resource capacity, mini-slot control resource capacity, and requirements of the radio bearer, and wherein the feedback option is decided from among the following options:
  (1) only a slot-based channel is used for feedback pertaining to both the first data and the second data;
  (2) a mini-slot-based channel is used for feedback pertaining to the second data and a slot-based channel is used for feedback pertaining to the first data; and
  (3) only a mini-slot-based channel is used for feedback pertaining to both the first data and the second data.

2. The method according to claim 1, further comprising: sending information about the decided feedback option to the UE.

3. The method according to claim 1, wherein the first data comprises Enhanced Mobile Broadband (eMBB) data and the second data comprises Ultra-Reliable Low Latency Communication (URLLC) data.

4. The method according claim 3, wherein the slot-based channel is a slot Physical Downlink Control Channel (PDCCH), and wherein the mini-slot-based channel is a mini-slot PDCCH.

5. The method according to claim 3, wherein option (1) is decided under any of the following conditions:
 when an immediate feedback for the URLLC data is not necessary;
 when the puncturing URLLC data is close to the end of the slot; and
 when a bundled puncturing of multiple URLLC data is close to the end of the slot, wherein the puncturing URLLC data comprises the bundled puncturing of multiple URLLC data.

6. The method according to claim 3 wherein option (2) is decided under any of the following conditions:
 when the immediate feedback for the URLLC data is essential to fulfil an URLLC performance; and
 when the puncturing URLLC data is close to the start of the slot.

7. The method according to claim 3, wherein option (1) is decided under any of the following conditions:
 when the immediate feedback for eMBB data is useful; and
 if chosen, to enable the UE to prepare and re-transmit an eMBB packet comprising the eMBB data immediately in the next slot.

8. The method according to claim 1, further comprising deciding a timing and an expected feedback for the decided feedback option.

9. A non-transitory, computer-readable medium storing computer-executable program instructions that, when executed by at least one processor, configures a network node comprising the at least one processor to perform operations according to claim 1.

10. A network node configurable to decide a feedback option of a message sent between the network node and a User Equipment (UE) in a wireless communication network, the message comprising a first data punctured by a second data, wherein the first data is sent in a slot of a radio bearer and the second data is sent a mini-slot of the radio bearer, and wherein the mini-slot is smaller than the slot, the network node comprising:
 at least one processor; and
 at least one memory storing computer-executable instructions that, when executed by the at least one processor, configure the network node to:
  decide a feedback option for feedback that is to be sent to the sender of the message, wherein deciding is based on at least one of: slot control resource capacity, mini-slot control resource capacity, and requirements of the radio bearer, and wherein the feedback option is decided from among the following options:
   (1) only a slot-based channel is used for feedback pertaining to both the first data and the second data;
   (2) a mini-slot-based channel is used for feedback pertaining to the second data and a slot-based channel is used for feedback pertaining to the first data; and
   (3) only a mini-slot-based channel is used for feedback pertaining to both the first data and the second data.

11. The network node according to claim 10, wherein execution of the instructions further configures the network node to send information about the decided feedback option to the UE.

12. The network node according to claim 10, wherein the first data comprises Enhanced Mobile Broadband (eMBB) data and the second data comprises Ultra-Reliable Low Latency Communication (URLLC) data.

13. The network node according to claim 10, wherein the slot-based channel is configured to be a slot PDCCH, and wherein the mini-slot-based channel is configured to be a mini-slot PDCCH.

14. The network node according to claim 12, wherein execution of the instructions further configures the network node to decide option (1) under any of the following conditions:
 when an immediate feedback for the URLLC data is not necessary;
 when the puncturing URLLC data is close to the end of the slot; and
 when a bundled puncturing of multiple URLLC data is close to the end of the slot,
  wherein the puncturing URLLC data comprises the bundled puncturing of multiple URLLC data.

15. The network node according to claim 12, wherein execution of the instructions further configures the network node to decide option (2) under any of the following conditions:
 when the immediate feedback for the URLLC data is essential to fulfil an URLLC performance; and
 when the puncturing URLLC data is close to the start of the slot.

16. The network node according to claim 12, wherein execution of the instructions further configures the network node to decide option (3) under any of the following conditions:
 when the immediate feedback for eMBB data is useful; and
 if chosen, to enable the UE to prepare and re-transmit an eMBB packet comprising the eMBB data immediately in the next slot.

17. The network node according to claim 10, wherein execution of the instructions further configures the network node to decide a timing and an expected feedback for the decided feedback option.

* * * * *